US008278884B2

(12) United States Patent  (10) Patent No.: US 8,278,884 B2
Morimoto et al.  (45) Date of Patent: Oct. 2, 2012

(54) DC-DC CONVERTER

(75) Inventors: Yoshinobu Morimoto, Hamamatsu (JP);
Shinji Asakawa, Hamamatsu (JP)

(73) Assignee: Roland Corporation, Hamamatsu-Shi, Shizuoka-Ken (JP)

( * ) Notice: Subject to any disclaimer, the term of this patent is extended or adjusted under 35 U.S.C. 154(b) by 172 days.

(21) Appl. No.: 12/792,581

(22) Filed: Jun. 2, 2010

(65) Prior Publication Data

US 2011/0074379 A1  Mar. 31, 2011

(30) Foreign Application Priority Data

Sep. 28, 2009  (JP) ................................. 2009-222619

(51) Int. Cl.
*G05F 1/00* (2006.01)

(52) U.S. Cl. ...................... 323/222; 323/284

(58) Field of Classification Search .................. 323/222, 323/223, 271, 282, 283, 284, 285
See application file for complete search history.

(56) References Cited

U.S. PATENT DOCUMENTS

| 7,432,688 | B2 * | 10/2008 | Liu et al. ....................... 323/224 |
| 7,965,071 | B2 * | 6/2011 | Saitoh ........................... 323/288 |
| 2009/0085546 | A1 * | 4/2009 | Phadke et al. ................ 323/284 |
| 2009/0152953 | A1 * | 6/2009 | Dong et al. .................... 307/80 |

* cited by examiner

*Primary Examiner* — Nguyen Tran
(74) *Attorney, Agent, or Firm* — Lee, Hong, Degerman, Kang & Waimey

(57) ABSTRACT

A DC-DC converter including a power supply supplying direct current (DC) to an inductor, a switching device controlling the supply of DC from the power supply to the inductor by switching between a conductive state and a disconnected state according to a modulation signal, a signal output device generating the modulation signal for increasing or decreasing a period of the conductive state of the switching device, wherein the signal output device increases or decreases a duty ratio of the modulation signal to increase or decrease the period of the conductive state of the switching device, and a delay device controlling an increase of a duty ratio of the modulation signal, wherein the signal output device outputs the modulation signal with the controlled duty ratio to the switching device, thereby delaying the switching device from reaching a conductive state in which the duty ratio is a value of 1.

9 Claims, 5 Drawing Sheets

US 8,278,884 B2

DC-DC CONVERTER

CROSS-REFERENCE TO RELATED APPLICATIONS

Pursuant to 35 U.S.C. §119(a), this application claims the benefit of earlier filing date and right of priority to Japanese Application No. 2009-222619, filed on Sep. 28, 2009, the contents of which is hereby incorporated by reference herein in its entirety.

FIELD OF THE INVENTION

The present invention relates to DC-DC converters and, in particular, to DC-DC converters capable of extending a period in which continuous boosting of an output voltage occurs, compared to conventional DC-DC converters.

BACKGROUND OF THE INVENTION

DC-DC converters that step up an output voltage by switching between supply and non-supply of direct current (DC) from a battery to a coil to generate an electromotive force in the coil are known. For example, a previously known DC-DC converter compares a target voltage with a stepped up output voltage and feeds back a drop in the output voltage with respect to the target voltage, thereby bringing the output voltage closer to the target voltage.

In the previously known DC-DC converter, when the battery voltage falls as the battery is drained, the drop in the output voltage with respect to the target voltage becomes greater. If such a condition continues, unreasonable voltage boosting is performed due to the feedback, and continued DC supply from the battery to the coil (a conductive state) may occur. As a result, the DC-DC converter may no longer be able to step up the voltage. In addition, coil burning, heat generation and destruction of internal parts due to excess current may occur, or destruction of the DC-DC converter by its own excess current may occur.

To prevent such incidents, the previously known DC-DC converter discontinues boosting of the output voltage when the battery voltage falls and a substantial drop in the output voltage with respect to the target voltage occurs. Therefore, the previously known DC-DC converter is problematic in that the period in which continuous boosting of the output voltage occurs is relatively short.

To solve the problems described above, the present invention provides a DC-DC converter that can extend a period in which continuous boosting of an output voltage occurs.

SUMMARY OF THE INVENTION

The present invention is directed to a direct current-to-direct current (DC-DC) converter. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a direct current-to-direct current (DC-DC) converter comprising an inductor, a power supply supplying direct current (DC) to the inductor, a switching device controlling the supply of DC from the power supply to the inductor by switching between a conductive state and a disconnected state according to a modulation signal input to the switching device, a signal output device generating the modulation signal for increasing or decreasing a period of the conductive state of the switching device, wherein the signal output device increases or decreases a duty ratio of the modulation signal to increase or decrease the period of the conductive state of the switching device, a rectifier rectifying an electromotive force generated at the switching device in response to the modulation signal input to the switching device, a smoothing and charging device smoothing and charging the rectified electromotive force, wherein the smoothed and charged electromotive force is supplied as an output voltage to a load connected in parallel with the smoothing and charging device, wherein the output voltage is stepped up to be closer in value to a target voltage, a voltage detector detecting an amount of drop of the output voltage with respect to the target voltage, an instruction device instructing to increase the duty ratio of the modulation signal generated by the signal output device when the amount of drop of the output voltage detected by the voltage detector increases, and a delay device controlling the increase of the duty ratio of the modulation signal generated by the signal output device according to instruction from the instruction device. The signal output device outputs the modulation signal with the controlled duty ratio to the switching device, thereby delaying the switching device from reaching a conductive state in which the duty ratio is a value of 1.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a DC-DC converter capable of extending a period in which continuous boosting of an output voltage occurs.

Figure 1:
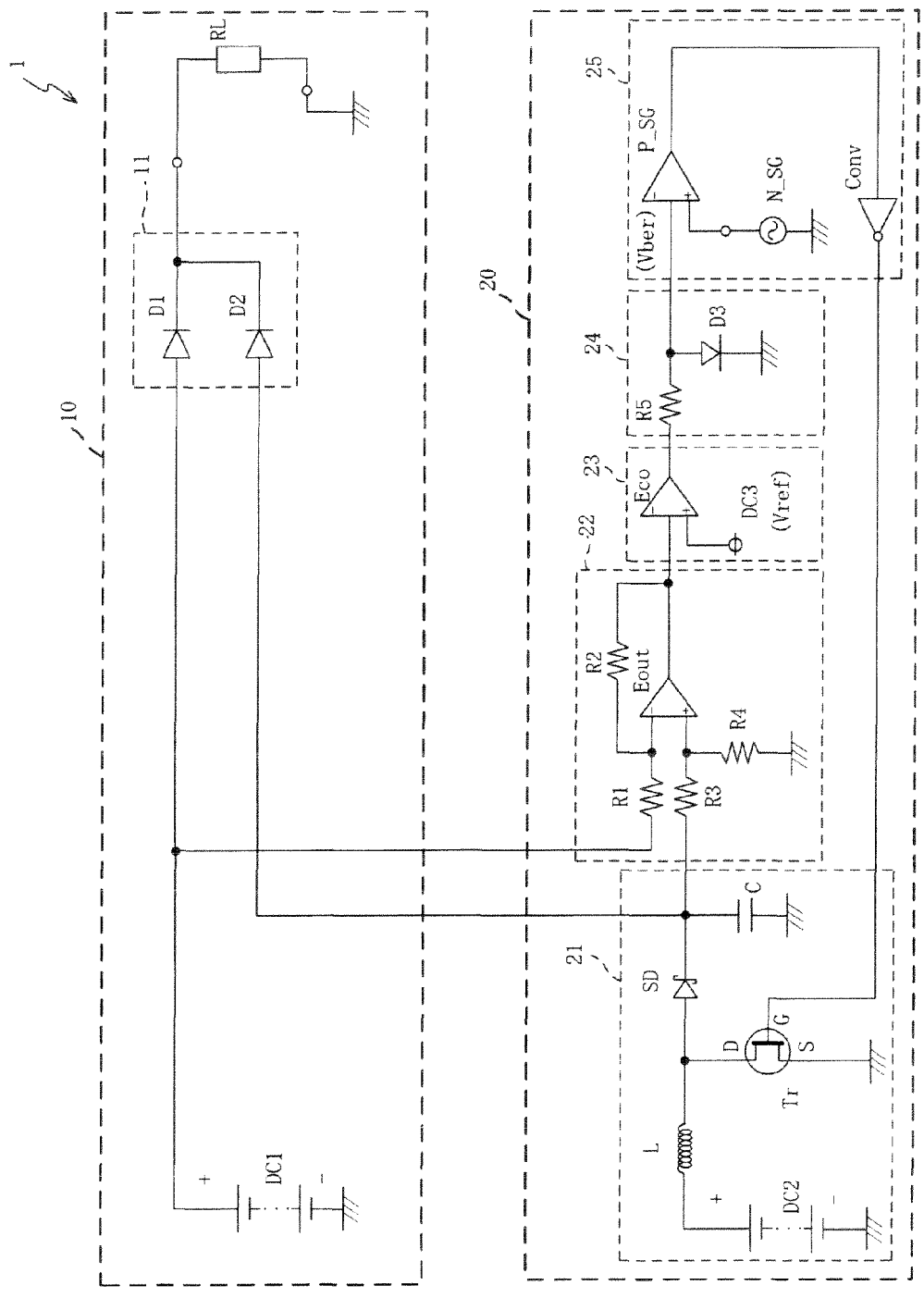
FIG. 1 is a diagram of a power supply circuit using a DC-DC converter in accordance with the present invention.

Embodiments of the invention will be described with reference to the accompanying drawings. FIG. 1 is a circuit diagram of an electrical composition of a power supply circuit 1 that uses a DC-DC converter 20 in accordance with the present invention. The power supply circuit 1 comprises a main power supply circuit 10 and the DC-DC converter 20. The DC-DC converter 20 is capable of extending a period in which continuous boosting of an output voltage occurs, compared to conventional DC-DC converters.

The main power supply circuit 10 is a main circuit that supplies a DC voltage to a load RL, and includes a main power supply DC1, a voltage selection circuit 11 and the load RL. The main power supply DC1 is a DC power supply that supplies a DC voltage at a maximum of 12 volt, for example. In one embodiment, the main power supply DC1 may be formed by serially connecting a plurality of 1.5-volt primary batteries. It is contemplated that a DC power supply supplying a maximum DC voltage higher or lower than 12 volt may also be used in accordance with the present invention.

The voltage selection circuit 11 is a circuit that selects one of two voltages, a supply voltage supplied from the main power supply DC1 or an output voltage outputted from the DC-DC converter 20. The voltage selection circuit 11 selects whichever of the two voltages has a higher value and supplies (applies) the selected voltage to the load RL. The voltage selection circuit 11 comprises two diodes, diodes D1 and D2. An anode of the diode D1 is connected to a positive terminal of the main power supply DC1 and a resistor R1 of the DC-DC converter 20. A cathode of the diode D1 is connected to one end of the load RL and a cathode of the diode D2. An anode of the diode D2 is connected to a terminal (one end of a capacitor C) that outputs a voltage stepped up by the DC-DC converter 20. The cathode of the diode D2 is connected to one end of the load RL and the cathode of the diode D1. Accordingly, the voltage selection circuit 11 selects a higher voltage between the main power supply voltage and the voltage outputted from the DC-DC converter, and supplies the selected voltage to the load RL.

The load RL operates upon application of the DC voltage, and may be, for example, a driver device that drives an audio speaker. It is noted that the other end of the load RL and the negative terminal of the main power supply DC1 are grounded.

The DC-DC converter 20 is a sub-circuit that supplies a supplemental output voltage (stepped up voltage) to the load RL, and includes a step-up circuit 21, a difference detection circuit 22, a drop detection circuit 23, a distortion circuit 24 and a step-up driver circuit 25.

The step-up circuit 21 is a circuit that steps up the DC voltage, and comprises an auxiliary power supply DC2, an inductor (e.g. coil) L, a field effect transistor Tr, a Schottky barrier diode SD and a capacitor C. The auxiliary power supply DC2 is a DC power supply that supplies a DC voltage at a maximum of 4 volt. However, it is contemplated that a DC power supply supplying a maximum DC voltage higher or lower than 4 volt may also be used in accordance with the present invention.

The inductor C is an element that circulates the DC current supplied from the auxiliary power supply DC2. One end of the inductor C is connected to a positive terminal of the auxiliary power supply DC2, and the other end thereof is connected to an anode of the Schottky barrier diode SD and a drain terminal of the field effect transistor Tr.

The field effect transistor Tr is a switching element that controls the DC current flowing from the auxiliary power supply DC2 to the inductor L, and comprises a gate terminal G connected to the step-up driver circuit 25 and a drain terminal D connected to the other end of the inductor C and the anode of the Schottky barrier diode SD. A source terminal S of the transistor Tr is grounded. The field effect transistor Tr conductively connects the drain terminal D and the source terminal S when a pulse signal (positive DC voltage) outputted from the step-up driver circuit 25 is inputted in the gate terminal G, and shuts off the drain terminal D from the source terminal S when the pulse signal from the step-up driver circuit 25 is not inputted in the gate terminal G. In other words, the conduction period of the field effect transistor Tr is controlled by a duty ratio that is a proportion of an output period of a pulse signal to a pulse cycle.

The Schottky barrier diode SD is a diode with excellent switching characteristics, and comprises an anode connected to the other end of the inductor C and the drain terminal D of the field effect transistor Tr and a cathode connected to one end of the capacitor C and to anode terminals of the difference detection circuit 22 and the diode D2. The Schottky barrier diode SD rectifies an electromotive force generated in the inductor L. The capacitor C charges the electromotive force rectified by the Schottky barrier diode SD, and smoothes the electromotive force generated in the inductor L. The other end of the capacitor C is grounded.

In accordance with the present invention, operation of the step-up circuit 21 will be described. When a pulse signal is outputted from the step-up driver circuit 25 and inputted to the gate terminal G of the field effect transistor Tr, the drain terminal D and the source terminal S of the field effect transistor Tr are conductively connected, and an electrical current flows through the inductor L. At this moment, the inductor C stores energy.

When the pulse signal is not outputted from the step-up driver circuit 25, and therefore, no pulse signal is inputted to the gate terminal G of the field effect transistor Tr, the drain terminal D and the source terminal S of the field effect transistor Tr are shut off. In this instance, the inductor C discharges any energy stored to maintain the current. By this, the inductor C generates an electromotive force, i.e., an output voltage that is a boosted DC voltage of the auxiliary power supply DC2. After having been rectified by the Schottky barrier diode SD, the output voltage is charged in the capacitor C, whereby a smoothed output voltage can be applied to the load RL.

The difference detection circuit 22 is a circuit that uses a supply voltage provided from the main power supply DC1 as a reference (target voltage for step-up), detects a difference in the output voltage with respect to the supply voltage, and outputs a difference detection voltage whose value is changed according to the detected difference. The difference detection circuit 22 comprises resistors R1, R2, R3 and R4 and an operational amplifier Eout. One end of the resistor R1 is connected to the main power supply DC1 and the anode of the diode D1. The other end of the resistor R1 is connected to an inversion input terminal of the operational amplifier Eout and one end of the resistor R2. The other end of the resistor R2 is connected to an output terminal of the operational amplifier Eout. One end of the resistor R3 is connected to one end of the capacitor C and the anode of the diode D2. The other end of the resistor R3 is connected to a non-inversion input terminal of the operational amplifier Eout and one end of the resistor R4. The other end of the resistor R4 is grounded. It is noted that the operational amplifier Eout uses the supply voltage of the main power supply DC1 as its power supply voltage, and its minimum operation voltage is 5 volt. However, it is contemplated that a minimum operation voltage higher or lower than 5 volt may also be used in accordance with the present invention.

The difference detection circuit 22 outputs a difference detection voltage of −1.5 volt when the voltage at one end of the resistor R1 (supply voltage of the main power supply DC1) is 12 volt and the voltage at one end of the resistor R3 (DC voltage of the auxiliary power supply DC2) is 0 volt. In other words, when the voltage of the main power supply DC1 is higher than the auxiliary power supply DC2, and their difference is at a maximum value, the difference detection circuit 22 will output a value of −1.5 volt.

The difference detection circuit 22 outputs a difference detection voltage of 0 volt when the voltage at one end of the resistor R1 (supply voltage of the main power supply DC1) is 12 volt and the voltage at one end of the resistor R3 (DC voltage of the auxiliary power supply DC2) is also 12 volt. In other words, when the voltage of the main power supply DC1 is the same as the auxiliary power supply DC2, the difference detection circuit 22 will output a value of 0 volt.

Furthermore, the difference detection circuit 22 outputs a difference detection voltage of +1.5 volt when the voltage at one end of the resistor R1 (supply voltage of the main power supply DC1) is 0 volt and the voltage at one end of the resistor R3 (DC voltage of the auxiliary power supply DC2) is 12 volt. In other words, when the voltage of the auxiliary power supply DC2 is higher than the main power supply DC1, and their difference is at a maximum value, the difference detection circuit 22 will output a value of +1.5 volt.

The drop detection circuit 23 is a circuit that detects a difference between the difference detection voltage outputted from the difference detection circuit 22 and a comparison (reference) voltage Vref, thereby judging an amount of change in the difference in the output voltage with respect to the supply voltage, and outputting a drop detection voltage according to the amount of change. The drop detection circuit 23 comprises an operational amplifier Eco. A non-inversion input terminal of the operational amplifier Eco is connected to a reference power supply DC3 that supplies the Vref voltage, and an inversion input terminal of the operational amplifier Eco is connected to the output terminal of the operational amplifier Eout and the other end of the resistor R2. It is noted that the operational amplifier Eco uses the supply voltage of the main power supply DC1 as its power supply voltage, and its minimum operation voltage is 5 volt. Also, the Vref voltage is set at 1.5 volt. However, it is contemplated that a minimum operation voltage higher or lower than 5 volt, and a Vref voltage other than 1.5 volt, may also be used in accordance with the present invention.

The drop detection circuit 23 outputs a voltage of +3 volt as a drop detection voltage when the difference detection voltage inputted to the inversion input terminal of the operational amplifier Eco is −1.5 volt. In other words, when the voltage of the main power supply DC1 is higher than the auxiliary power supply DC2, and their difference is at a maximum value, the drop detection circuit 23 outputs a value of +3 volt.

The drop detection circuit 23 outputs a voltage of +1.5 volt as a drop detection voltage when the difference detection voltage inputted to the inversion input terminal of the operational amplifier Eco is 0 volt. In other words, when the voltage of the main power supply DC1 is the same as the auxiliary power supply DC2, the drop detection circuit 23 outputs a value of +1.5 volt.

Furthermore, the drop detection circuit 23 outputs a voltage of 0 volt as a drop detection voltage when the difference detection voltage inputted to the inversion input terminal of the operational amplifier Eco is +1.5 volt. In other words, when the voltage of the auxiliary power supply DC2 is higher than the main power supply DC1, and their difference is at a maximum value, the drop detection circuit 23 outputs a value of 0 volt. Notably, the Vref voltage is set at 1.5 volt when the supply voltage of the main power supply DC1 is 12 volt in order to set the duty ratio of a pulse signal outputted from the step-up driver circuit 25 to 0.5 (50%) when the voltage of the auxiliary power supply DC2 is the same as the supply voltage of the main power supply DC1.

The maximum value of the drop detection voltage to be outputted from the operational amplifier Eco is 3 volt, which is lower than the minimum operation voltage of 5 volt. Therefore, even when the power supply voltage of the operational amplifier Eco drops due to discharging of the main power supply DC1 (i.e. lowering of the supply voltage of the main power supply DC1), the operational amplifier Eco is not affected by the discharging of the main power supply DC1, and can output the drop detection voltage of 3 volt at the maximum. Accordingly, even when the main power supply DC1 is discharged and thus the supply voltage of the main power supply DC1 lowers, the drop detection circuit 23 is not affected, and can output the drop detection voltage corresponding to a voltage difference between the voltage of the main power supply DC1 and the voltage of the auxiliary power supply DC2 until a value of the supply voltage becomes lower than 5 volt.

The distortion circuit 24 is a circuit that distorts the drop detection voltage outputted from the drop detection circuit 23 into a non-linearly increasing variable DC voltage Vber so that the variable Vber inputted into the step-up driver circuit 25 does not exceed a value of approximately 0.8 volt. The distortion circuit 24 comprises a resistor R5 and a diode D3. One end of the resistor R5 is connected to an output terminal of the operational amplifier Eco, and the other end of the resistance R5 is connected to the anode terminal of the diode D3 and the step-up driver circuit 25. The cathode terminal of the diode D3 is grounded.

Figure 2:
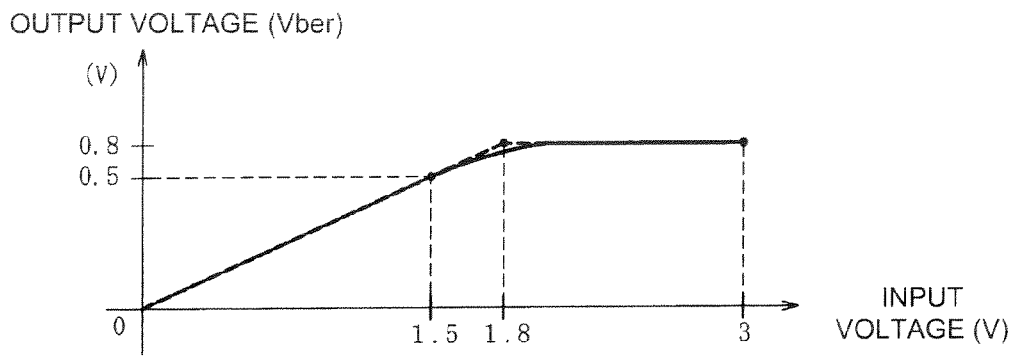
FIG. 2 is a graph illustrating a relationship between input voltages and output voltages of a distortion circuit in accordance with the present invention.

In accordance with the present invention, operation of the distortion circuit 24 will be described with reference to FIG. 2. FIG. 2 is a graph illustrating a relationship between input voltages and output voltages of the distortion circuit 24. Upon detecting the drop detection voltage from the drop detection circuit 23, the distortion circuit 24 voltage-divides the drop detection voltage (input voltage) with the resistor R5 and the diode D3. When the drop detection voltage increases (input voltage increases), the voltage applied to the resistor R5 and the diode D3 increases accordingly. However, when the drop detection voltage becomes 1.8 volt, and the voltage applied to the diode D3 becomes approximately 0.8 volt, the voltage applied to the diode D3 is maintained at approximately 0.8 volt even when the drop detection voltage further increases. Therefore, according to the operation of the distortion circuit 24, the voltage applied to the diode D3, i.e., the output voltage of the distortion circuit 24 or the variable DC voltage Vber inputted to the step-up driver circuit 25, does not exceed approximately 0.8 volt.

The step-up driver circuit 25 is a circuit that outputs a pulse signal for switching between conduction and disconnection of the field effect transistor Tr of the step-up circuit 21. The step-up driver circuit 25 comprises a pulse wave generator P_SG, a sawtooth wave generator N_SG and an inverter Conv. The pulse generator P_SG is a generator that generates a pulse wave whose duty ratio is variable. A non-inversion input terminal of the pulse generator P_SG is connected to the sawtooth wave generator N_SG, and an inversion input terminal of the pulse generator P_SG is connected to the anode of the diode D3 and the other end of the resistor R5 of the distortion circuit 24. The pulse generator P_SG compares a sawtooth wave inputted to the non-inversion input terminal with the variable DC voltage Vber inputted to the inversion input terminal, and generates a pulse wave during a period in which an amplitude value of the sawtooth wave exceeds the variable DC voltage Vber.

The sawtooth wave generator N_SG is a generator that generates a sawtooth wave whose minimum value is zero (0) volt and maximum value (wave height value) is 1.0 volt. The inverter Conv inverts a pulse wave outputted from the pulse wave generator P_SG and outputs a pulse signal, wherein an input terminal of the inverter Conv is connected to an output terminal of the pulse wave generator P_SG. An output terminal of the inverter Conv is connected to the gate terminal G of the field effect transistor Tr. With this connection, the step-up driver circuit 25 monotonically increases the duty ratio of the pulse signal with an increase in the period in which the amplitude value of the sawtooth wave inputted to the non-inversion input terminal of the pulse generator P_SG exceeds the variable DC voltage Vber inputted to the inversion input terminal of the pulse generator P_SG.

Figure 3:
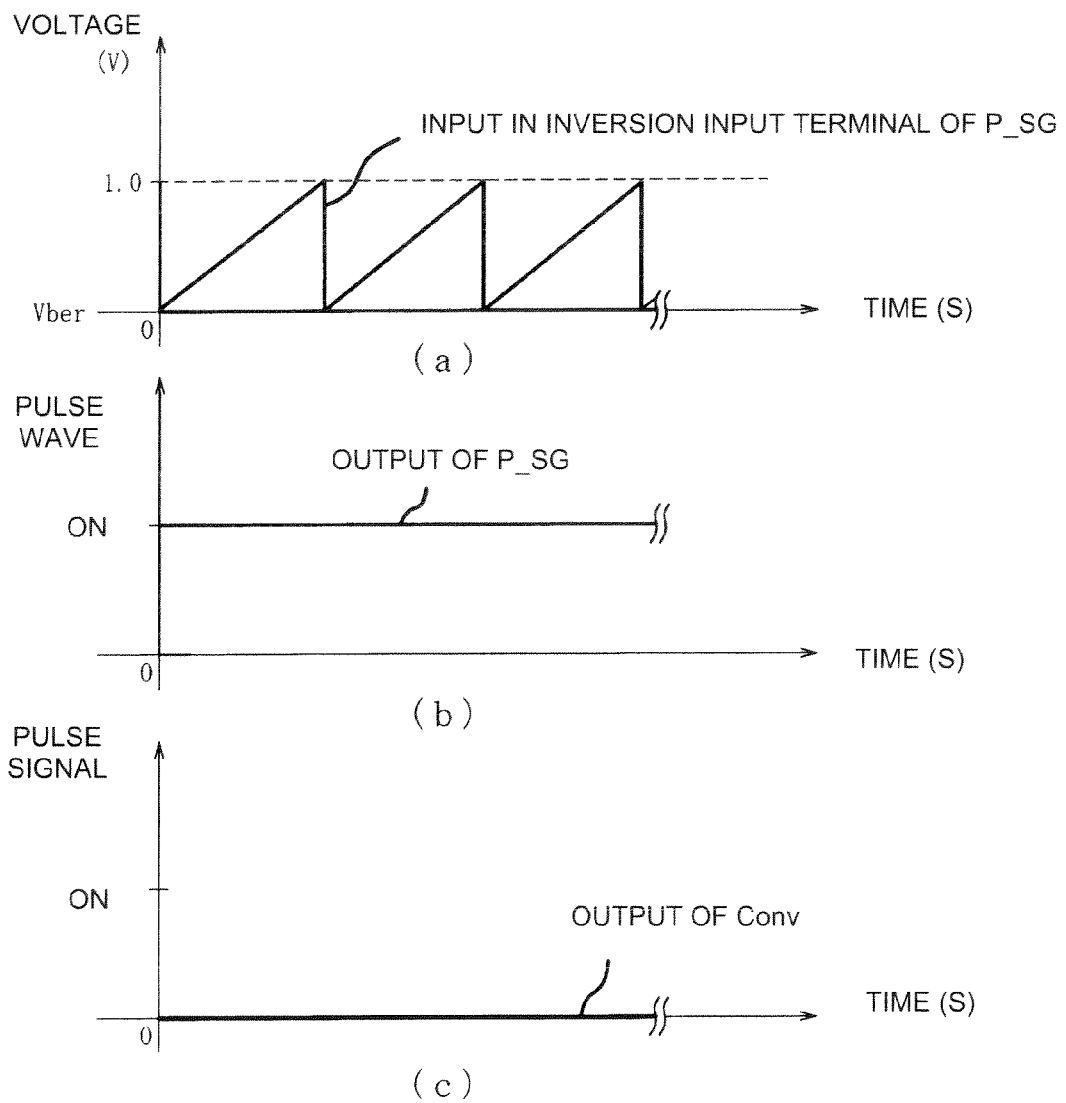
FIG. 3 illustrates various signal waveforms when a supply voltage of a main power supply is 0 volt, and a DC voltage of an auxiliary power supply is 12 volt in accordance with the present invention.
Figure 4:
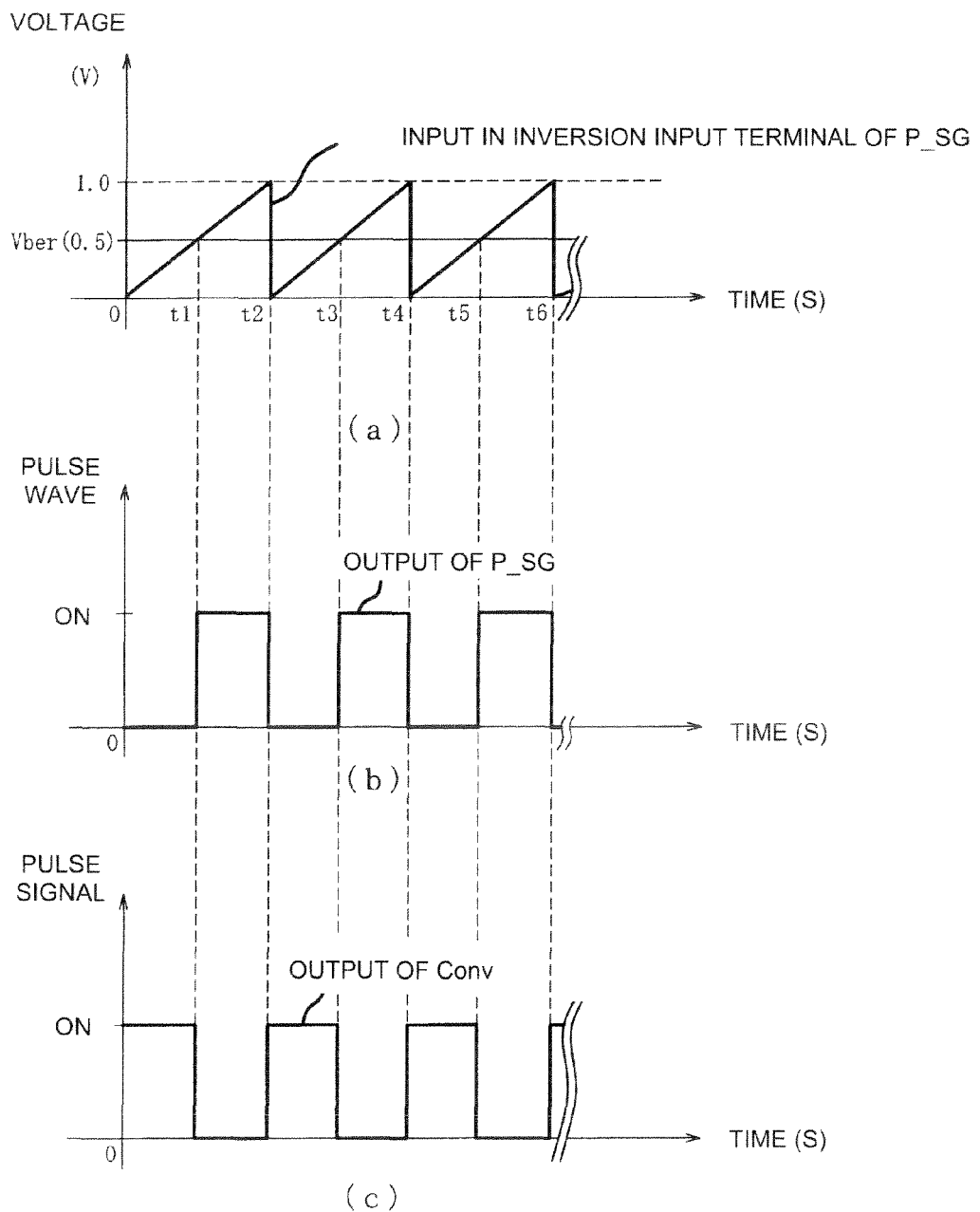
FIG. 4 illustrates various signal waveforms when a supply voltage of a main power supply is 12 volt, and a DC voltage of an auxiliary power supply is 12 volt in accordance with the present invention.
Figure 5:
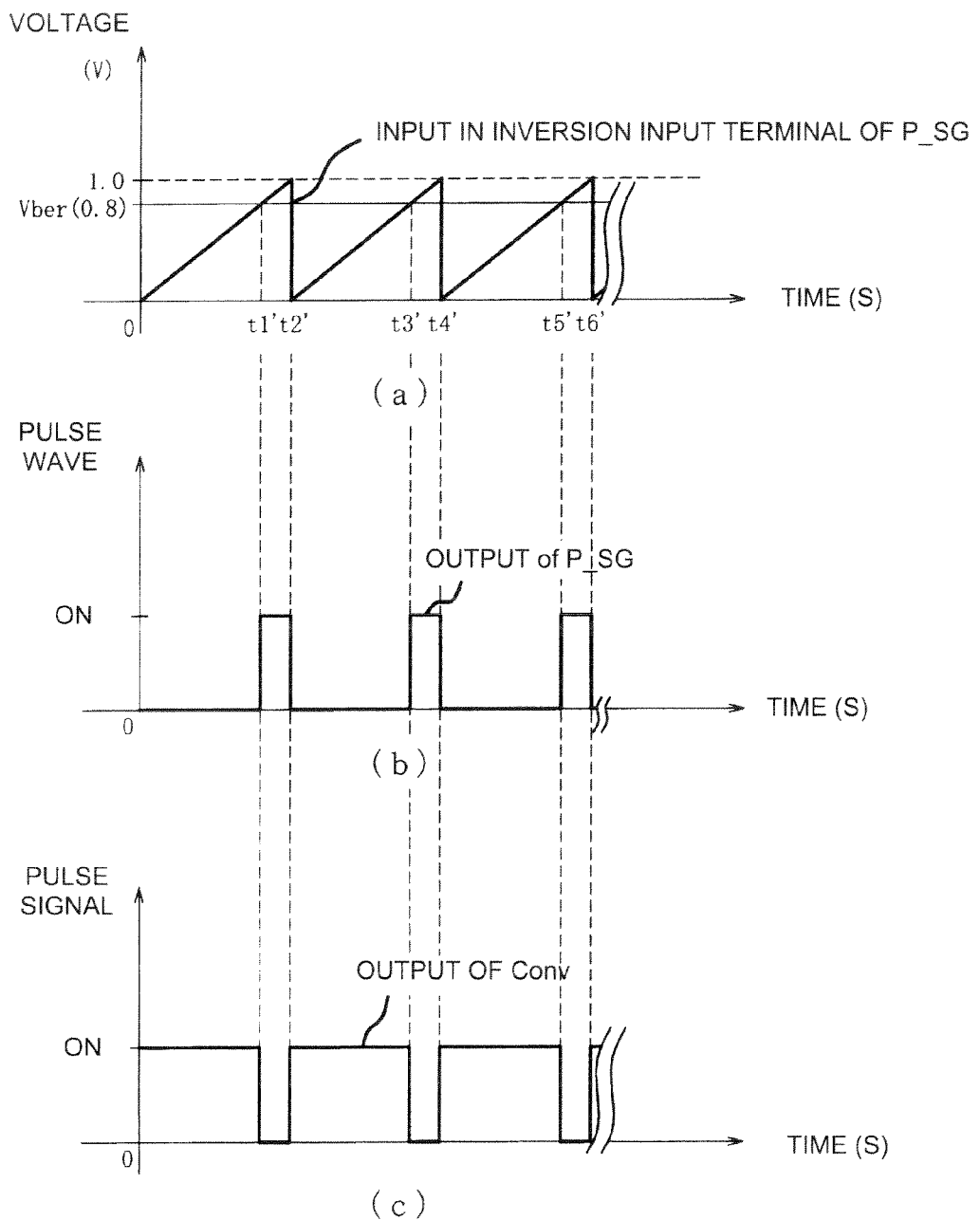
FIG. 5 illustrates various signal waveforms when a supply voltage of a main power supply is 12 volt, and a DC voltage of an auxiliary power supply is 0 volt in accordance with the present invention.

Referring to FIGS. 3 to 5, operations of the DC-DC converter 20 will be described. In FIGS. 3(a), 4(a) and 5(a), a waveform of a sawtooth wave inputted to the non-inversion input terminal of the pulse generator P_SG and a waveform of a variable DC voltage Vber inputted to the inversion input terminal of the pulse generator P_SG is shown. In FIGS. 3(b), 4(b) and 5(b), a waveform of a pulse wave outputted from the pulse generator P_SG is shown. In FIGS. 3(c), 4(c) and 5(c), a waveform of a pulse signal outputted from the inverter Conv is shown.

Additionally, FIG. 3 shows the signal waveforms when the supply voltage of the main power supply DC1 is 0 volt, and the DC voltage of the auxiliary power supply DC2 is 12 volt. In other words, FIG. 3 shows when the voltage of the auxiliary power supply DC2 is higher than the main power supply DC1, and their difference is at a maximum value. FIG. 4 shows the signal waveforms when the supply voltage of the main power supply DC1 is 12 volt, and the DC voltage of the auxiliary power supply DC2 is also 12 volt. In other words, FIG. 4 shows when the voltage of the main power supply DC1 is the same as the auxiliary power supply DC2. FIG. 5 shows the signal waveforms when the supply voltage of the main power supply DC1 is 12 volt, and the DC voltage of the auxiliary power supply DC2 is 0 volt. In other words, FIG. 5 shows when the voltage of the main power supply DC1 is higher than the auxiliary power supply DC2, and their difference is at a maximum value.

Referring to FIGS. 1 and 3, a case in which the voltage of the main power supply DC1 is 0 volt and the DC voltage of the auxiliary power supply DC2 is 12 volt will be described. Referring to FIGS. 1 and 3(a), when the drop detection circuit 23 outputs a voltage of 0 volt as the drop detection voltage, the variable DC voltage Vber becomes 0 volt. Therefore, as shown in FIG. 3(a), the amplitude of the sawtooth wave (i.e., the input of the non-inversion input terminal of the pulse generator P_SG) always exceeds the variable DC voltage Vber, such that the pulse generator P_SG generates a pulse wave with the duty ratio of 1 (100%), as shown in FIG. 3(b). Accordingly, as shown in FIG. 3(c), the duty ratio of the pulse signal outputted from the inverter Conv is 0. In this instance, the field effect transistor Tr is placed in a shut-off state, such that boosting of the voltage by the step-up circuit 21 is stopped. By this, the output voltage of the DC-DC converter 20 is brought closer to 0 volt, which is the supply voltage of the main power supply DC1.

Referring to FIGS. 1 and 4, a case in which the voltage of the main power supply DC1 is 12 volt, and the DC voltage of the auxiliary power supply DC2 is also 12 volt will be described. Referring to FIGS. 1 and 4(a), when the drop detection circuit 23 outputs a voltage of +1.5 volt as the drop detection voltage, the voltage applied to the diode D3 is 0.5 volt (see FIG. 2), such that the variable DC voltage Vber becomes 0.5 volt. Therefore, as shown in FIG. 4(a), the periods in which the amplitude of the sawtooth wave (i.e., the input of the non-inversion input terminal of the pulse generator P_SG) exceeds the variable DC voltage Vber are at a time t1-t2, a time t3-t4 and a time t5-t6. In synchronization with these times, the pulse generator P_SG generates a pulse wave with the duty ratio of 0.5 (50%), as shown in FIG. 4(b). Accordingly, the duty ratio of the pulse signal outputted from the inverter Conv is 0.5, as shown in FIG. 4(c). In this case, the field effect transistor Tr repeats the conduction state and the shut-off state at equal time intervals. By this, the output voltage of the DC-DC converter 20 is maintained at 12 volt, which is the same voltage as the supply voltage of the main power supply DC1.

Referring to FIGS. 1 and 5, a case in which the voltage of the main power supply DC1 is 12 volt and the DC voltage of the auxiliary power supply DC2 is 0 volt will be described. Referring to FIGS. 1 and 5(a), when the drop detection circuit 23 outputs a voltage of +3.0 volt as the drop detection voltage, the voltage applied to the diode D3 is 0.8 volt (see FIG. 2), such that the variable DC voltage Vber becomes 0.8 volt. Therefore, as shown in FIG. 5(a), the periods in which the amplitude of the sawtooth wave (i.e., the input of the non-inversion input terminal of the pulse generator P_SG) exceeds the variable DC voltage Vber are at a time t1'-t2', a time t3'-t4', and a time t5'-t6'. In synchronization with these times, the pulse generator P_SG generates a pulse wave with the duty ratio of 0.2 (20%), as shown in FIG. 5(b). Accordingly, the duty ratio of the pulse signal outputted from the inverter Conv is 0.8, as shown in FIG. 5(c). By this, the output voltage of the DC-DC converter 20 is stepped up with the supply voltage of the main power supply DC1, which is a target voltage of 12 volt.

Figure 6:
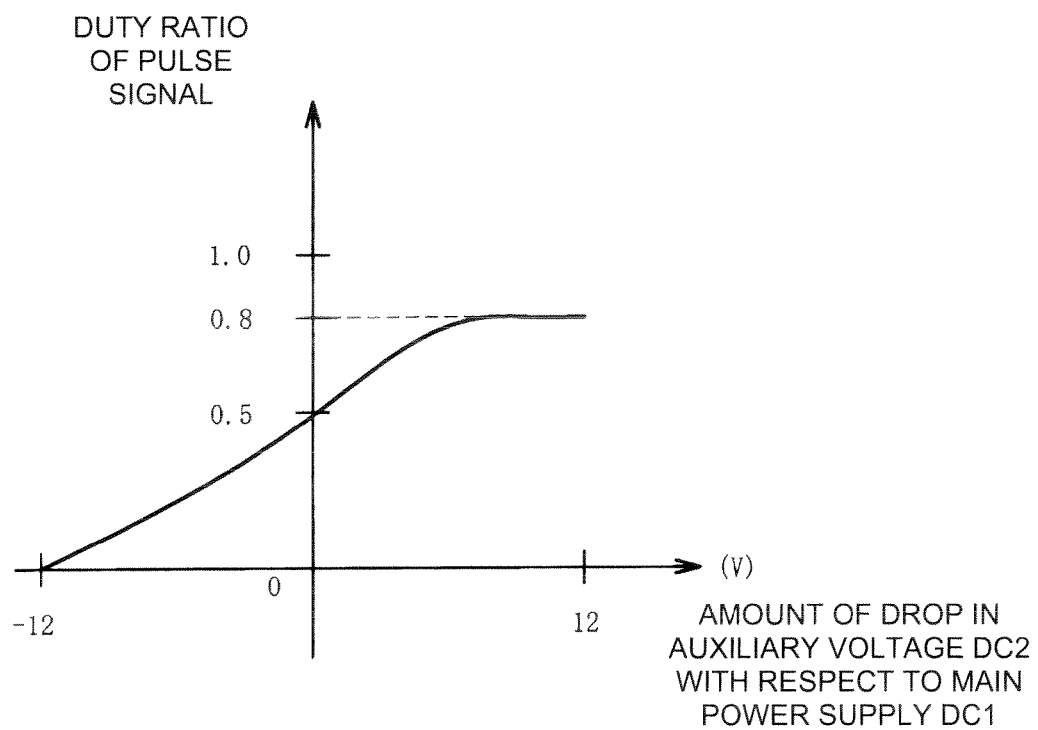
FIG. 6 is a graph illustrating a relationship between an amount of drop in an auxiliary power supply with respect to a main power supply and a duty ratio of a pulse signal outputted from an inverter in accordance with the present invention.

The results described above will be explained with reference to FIG. 6. FIG. 6 is a graph illustrating a relationship between an amount of drop in the auxiliary power supply DC2 with respect to the main power supply DC1 and a duty ratio of a pulse signal outputted from the inverter Conv. As shown in FIG. 6, when the supply voltage of the main power supply DC1 is 0 volt and the DC voltage of the auxiliary power supply DC2 is 12 volt, the amount of drop in the auxiliary power supply DC2 with respect to the main power supply DC1 is −12 volt, such that the duty ratio of the pulse signal outputted from the inverter Conv is 0. This provides the same result as that shown in FIG. 3.

When the supply voltage of the main power supply DC1 is 12 volt and the DC voltage of the auxiliary power supply DC2 is also 12 volt, the amount of drop in the auxiliary power supply DC2 with respect to the main power supply DC1 is 0 volt, such that the duty ratio of the pulse signal outputted from the inverter Conv is 0.5. This provides the same result as that shown in FIG. 4.

When the supply voltage of the main power supply DC1 is 12 volt and the DC voltage of the auxiliary power supply DC2 is 0 volt, the amount of drop in the auxiliary power supply DC2 with respect to the main power supply DC1 is +12 volt, such that the duty ratio of the pulse signal outputted from the inverter Conv is approximated to a linear line whose duty ratio is maintained at 0.8. This provides the same result as that shown in FIG. 5.

As described above, even when the supply voltage of the main power supply DC1 is 12 volt, and the DC voltage of the auxiliary power supply DC2 becomes 0 volt, i.e., even when the voltage of the main power supply DC1 is higher than that of the auxiliary power supply DC2, and their difference is at a maximum, the distortion circuit 24 suppresses the variable DC voltage Vber to 0.8 volt, whereby the variable DC voltage Vber is prevented from exceeding the wave height value of the sawtooth wave. Accordingly, with the pulse wave generated by the pulse generator P_SG, the minimum value of the duty ratio can be made greater than zero. Thus, the distortion circuit 24 prevents the maximum value of the duty ratio of the pulse signal outputted from the inverter Conv, i.e., the maximum value of the duty ratio of the pulse signal inputted to the gate terminal of the field effect transistor Tr, from becoming 1 (100%). Hence, the maximum value of the duty ratio is restricted to be less than 1, and the time in which the field effect transistor Tr is in a state of being continuously maintained in a conduction state is extended.

In other words, the distortion circuit 24 extends the time in which the DC current from the auxiliary power supply DC2 is continuously supplied to the inductor (coil) L. Accordingly, even when a drop in the output voltage stepped up by the step-up circuit 21 becomes substantially large with respect to the supply voltage of the main power supply DC1 (with respect to the target voltage), the step-up of the output voltage of the step-up circuit 21 can continue without being stopped. Therefore, according to the DC-DC converter 20 of one embodiment, the period in which continuous boosting of an output voltage occurs can be extended, compared to the conventional DC-DC converter.

The DC-DC converter 20 of the present invention is particularly effective when applied to devices that permit drops in voltage applied to the load RL. For example, such devices may include sound emission devices that permit a drop in voltage applied to speakers (e.g., sound emission devices that permit a drop in sound volume to be outputted), and light emission devices that permit a drop in voltage applied to light bulbs (e.g., light emission devices that permit a drop in luminance).

Also, according to the DC-DC converter 20 of the present invention, the distortion circuit 24 monotonically increases the variable DC voltage Vber when the drop detection voltage of the drop detection circuit 23 is less than 1.8 volt (i.e., when a drop detection voltage indicates that the duty ratio of the pulse signal inputted to the gate terminal G of the field effect transistor Tr is less than 0.8). Accordingly, the step-up driver circuit 25 monotonically increases the duty ratio of the pulse signal. In other words, the distortion circuit 24 allows an instruction from the drop detection circuit 23 to monotonically increase the duty ratio according to the drop detection voltage, and has the step-up driver circuit 25 output a pulse signal with the instructed duty ratio.

On the other hand, when the drop detection voltage of the drop detection circuit 23 becomes 1.8 volt or greater (i.e., when a drop detection voltage indicates that the duty ratio of the pulse signal exceeds 0.8), the distortion circuit 24 approximates the variable DC voltage Vber to a forward direction voltage of the diode D3 of 0.8 volt when the drop detection voltage of the drop detection circuit 23 increases. In other words, when a drop detection voltage indicating that the duty ratio of the pulse signal exceeds 0.8 is outputted, the distortion circuit 24 approximates the duty ratio indicated by the drop detection voltage to a linear line by which the duty ratio is controlled to be 0.8 as the voltage of the auxiliary power supply DC2 becomes lower than the main power supply DC1. Accordingly, the indicated duty ratio is controlled to be 0.8 (less than 1). By this, the distortion circuit 24 extends the time that the field effect transistor Tr is continuously kept in a conduction state. Therefore, when the drop detection circuit 23 outputs a drop detection voltage indicating that the duty ratio of the pulse signal is less than 0.8, boosting of the output voltage to bring it closer to the supply voltage of the main power supply DC1 is performed.

On the other hand, when the drop detection circuit 23 outputs a drop detection voltage indicating that the duty ratio of the pulse signal exceeds 0.8, the duty ratio is controlled to be at 0.8, thereby allowing a drop in the output voltage with respect to the supply voltage and continuing boosting of the output voltage. Therefore, according to the DC-DC converter 20 in accordance with one embodiment, when the duty ratio of a pulse signal indicated by a drop detection voltage exceeds 0.8, the DC-DC converter 20 is allowed to perform its original function of boosting the output voltage to be brought closer to the supply voltage of the main power supply DC1 (the target voltage), while the period in which continuous boosting of the output voltage occurs can be extended, compared to the conventional DC-DC converter.

Moreover, according to the DC-DC converter 20 in accordance with the present invention, the difference detection circuit 22 uses the supply voltage supplied from the main power supply DC1 as a reference (target voltage for voltage step-up) and detects a difference between the output voltage and the supply voltage, and outputs a difference detection voltage whose value is changed according to the difference. In other words, when the supply voltage supplied from the main power supply DC1 drops, the difference detection circuit 22 uses the dropped supply voltage as the target voltage, and detects a difference between the output voltage and the supply voltage.

By this, when the supply voltage supplied from the main power supply DC1 drops, the output voltage to be stepped up by the step-up circuit 21 can be lowered. Therefore, this prevents an incident where the boosted output voltage becomes relatively higher than the supply voltage supplied from the main power supply DC1 due to the dropping of the supply voltage supplied from the main power supply DC1 whereby the auxiliary power supply DC2 is considerably discharged with respect to the main power supply DC1. Accordingly, the operational period of the auxiliary power supply DC2 can be extended.

In addition, according to the power supply circuit 1 of one embodiment, the difference detection circuit 22 uses the dropped supply voltage as the target voltage, such that a step-up rate of the output voltage can be controlled to a lower value, compared to a case where the difference detection circuit 22 uses a predetermined constant voltage as the target voltage, such as in the conventional DC-DC converter. Accordingly, the time in which the duty ratio is a maximum value (less than 1) can be extended, compared to the conventional DC-DC converter. Consequently, the operational period of the main battery that is used with the DC-DC converter can be extended, compared to the conventional DC-DC converter. In other words, discharging of the main power supply DC1 that is used with the DC-DC converter 20 can be suppressed, whereby the operational period of the main power supply DC1 can be extended, compared to the conventional DC-DC converter.

In the DC-DC converter 20 according to one embodiment, the difference detection circuit 22, the drop detection circuit 23, the distortion circuit 24 and the step-up driver circuit 25 comprise an electrical circuit using electronic devices. However, the invention is not limited thereto. The difference detection circuit 22, the drop detection circuit 23, the distortion circuit 24 and the step-up driver circuit 25 may be realized by signal processing (software) using a central processing unit (CPU).

In one example, instead of the difference detection circuit 22, signal processing may be performed by using a supply voltage supplied from the main power supply DC1 as a reference (target voltage for step-up), detecting a difference in the output voltage with respect to the supply voltage, and outputting, for example, a difference detection signal whose amplitude value is changed according to the difference.

In another example, instead of the drop detection circuit 23, signal processing may performed by detecting how much the difference detection signal differs with respect to a comparison voltage Vref, thereby judging the amount of change in the difference between the output voltage and the supply voltage, and outputting, for example, a drop detection signal whose amplitude value is changed according to the amount of change.

In a further example, instead of the distortion circuit 24, signal processing may be performed by distorting the drop detection signal (i.e., linearly increasing the variable DC voltage Vber), thereby controlling the variable DC voltage Vber to about 0.8 volt.

In another example, instead of the step-up driver circuit 25, signal processing may be performed by inputting a sawtooth wave and the variable DC voltage Vber, comparing the two inputs, generating a pulse wave according to the periods in which the sawtooth wave exceeds the variable DC voltage Vber, generating a pulse signal by inverting the pulse wave, and outputting the pulse signal to the gate terminal G of the field effect transistor Tr.

According to examples above, any of the difference detection circuit 22, the drop detection circuit 23, the distortion circuit 24 and the step-up driver circuit 25 can be implemented via a signal processing scheme (software), and not by an electronic circuit, such that the DC-DC converter 20 can be made smaller in size.

In the DC-DC converter 20 according to one embodiment, the main power supply DC1 of 12 volt is formed by serially connecting 1.5-volt primary batteries. However, without any particular limitation to the above, the main power supply DC1 may be formed with a 12-volt secondary battery. Also, the auxiliary power supply DC2 may be formed with a 4-volt secondary battery, or may be formed with an electric double layer capacitor. When the auxiliary power supply DC2 is formed with a secondary battery or an electric double layer capacitor, the auxiliary power supply DC2 may be structured so as to be charged by DC power supplied from the main power supply DC1.

In the DC-DC converter 20 according to one embodiment, a pulse signal is used as the signal that controls conduction and disconnection of the field effect transistor Tr (the signal outputted to the gate terminal G). However, without any particular limitation to the above, the signal that controls conduction and disconnection of the field effect transistor Tr can be any signal comprising an ON and OFF state. Therefore, the signal may be a sine wave, a square wave or a triangular wave comprising a positive half wave corresponding to an ON state and a DC voltage corresponding to an OFF state. Alternatively, the signal may be a sine wave, a square wave or a triangular wave comprising a negative half wave corresponding to an ON state and a DC voltage corresponding to an OFF state.

In the DC-DC converter 20 according to one embodiment, the Schottky barrier diode SD is used as an element for rectifying the electromotive force generated in the inductor (coil) L. However, without any particular limitation to the above, an element that circulates the current in one direction may be used instead of the Schottky barrier diode SD. For example, ordinary diodes and field effect transistors (FETs) having high-speed switching characteristics may be used. Also, any one of elements having various shapes and compositions that function as inductors may be used as the inductor (coil) 1.

To achieve the objects of the invention, a DC-DC converter is equipped with an inductance device having an inductance element; a current supply device that supplies a DC power supply; a switching device that controls supply and stop of the DC current from the current supply device to the inductance device by switching between conducting and breaking; a signal output device that generates a modulation signal for increasing or decreasing a conducting period of the switching device by increasing or decreasing a duty ratio that is a proportion of time during which a signal output period occupies in each one cycle; a rectifier device that rectifies an electromotive force generated at the switching device in response to the modulation signal outputted from the signal output device; and a smoothing and charging device that smoothes and charges the rectified electromotive force, wherein the electromotive force smoothed by the smoothing and charging device is supplied as an output voltage to a load connected in parallel with the smoothing and charging device, and the output voltage supplied is stepped up closer to a target voltage, and the DC-DC converter is equipped with a detection device that detects a drop in the output voltage with respect to the target voltage; an increase instruction device that instructs to increase the duty ratio of the modulation signal that is generated by the signal output device according to the drop detected by the detection device; and a delay device that controls the increase in the duty ratio instructed to be increased by the increase instruction device and outputs the modulation signal with the controlled duty ratio to the signal output device, thereby delaying the switching device to reach a conduction state in which the duty ratio becomes a value of 1.

It is noted that the modulation signal may be any signal that comprises a signal outputting state and a signal stopped state, and can be a pulse signal comprising ON and OFF, a sine wave, a square wave or a triangular wave comprising a positive half wave corresponding to ON and OFF, or a sine wave, a square wave or a triangular wave comprising a negative half wave corresponding to ON and OFF. Also, the conduction state is a state in which the DC current is continuously supplied from the current supply device to the switching device.

The increase instruction device gives an instruction to monotonically increase the duty ratio of the modulation signal to be generated by the signal output device as the amount of drop detected by the detection device becomes greater; the delay device allows the increase instruction device to give the instruction to monotonically increase the duty ratio when the duty ratio instructed to be increased by the increase instruction device becomes to be less than a specified value that is a value less than 1, such that the signal output device outputs the modulation signal with the duty ratio instructed, while, when the duty ratio instructed to be increased by the increase instruction device exceeds the specified value, the delay device approximates the duty ratio instructed to be increased by the increase instruction device according to an increase in the amount of drop detected by the detection device to a linear line by which the duty ratio is suppressed to the specified value thereby controlling the duty ratio instructed to be increased to be less than 1, thereby delaying the switching device to reach the conduction state.

The DC-DC converter may be equipped with a main battery comprising a primary battery or a secondary battery to supply a DC power supply to the load, independently of the output voltage stepped up, wherein the current supply device comprises a primary battery or a secondary battery, and the detection device detects the amount of drop with the DC voltage supplied from the main power supply as the target voltage.

According to the DC-DC converter of the present invention, as the amount of drop detected by the detection device becomes greater due to a drop in the DC current supplied from the current supply device to the inductance device, in other words, as the amount of drop in the output voltage with respect to the target voltage becomes greater, the increase instruction device gives an instruction to increase the duty ratio of the modulation signal to be generated by the signal output device. As a result, the conducting period of the switching device is increased and the electromotive force to be charged in the smoothing and charging device is increased, whereby the output voltage is brought closer to the target voltage. When the drop in the DC current supplied by the current supply device to the inductance device further increases, and the drop in the output voltage with respect to the target voltage further becomes greater, the increase instruction device gives an instruction to further increase the duty ratio of the modulation signal to be generated by the signal output device. As a result, the conducting period of the switching device further increases. At this time, the delay device controls the increase in the duty ratio instructed to be increased by the increase instruction device, and has the signal output device output the modulation signal with the controlled duty ratio, thereby delaying the switching device to reach a conduction state in which the duty ratio becomes a value of 1.

In other words, the delay device extends the time in which the DC current from the current supply device is continuously supplied to the inductance device. As a result, even when the drop in the output voltage with respect to the target voltage becomes substantially large, the step-up of the output voltage can be continued without stopping. Accordingly, compared to the conventional DC-DC converter, the invention is effective in extending the period in which continuous boosting of the output voltage occurs. If the DC-DC converter of the present invention is used with a battery (battery independent of the current supply device) that supplies a DC current to a load, the period in which boosting of the output voltage continues is extended, whereby discharging of the battery to be used together can be suppressed, and the operational period of the battery to be used together can be extended. The DC-DC converter is particularly effective for devices that permit drops in voltage applied to a load.

In addition to the effect achieved by the DC-DC converter above, the following effect can also be achieved. The delay device allows the increase instruction device to give an instruction to monotonically increase the duty ratio when the duty ratio instructed to be increased by the increase instruction device becomes less than a specified value, which may be a value less than 1, such that the signal output device outputs the modulation signal with the instructed duty ratio. On the other hand, when the duty ratio instructed to be increased by the increase instruction device exceeds the specified value, the delay device approximates the duty ratio instructed to be increased by the increase instruction device, according to an increase in the drop detected by the detection device, to a linear line by which the duty ratio is controlled to the specified value, thereby suppressing the duty ratio instructed to be increased to be less than a value of 1.

By this, the delay device extends the time in which the switching device is in a conduction state. Accordingly, when the duty ratio instructed to be increased by the increase instruction device becomes less than the specified value, the output voltage is stepped up to be brought closer to the target voltage. On the other hand, when the duty ratio instructed to be increased by the increase instruction device exceeds the specified value, the duty ratio is controlled to be less than a value of 1 to allow a drop in the output voltage with respect to the target voltage, while continuing to step up the output voltage. Therefore, until the duty ratio instructed to be increased by the increase instruction device exceeds the specified value, the DC-DC converter is allowed to perform its original function of voltage step-up to bring the output voltage closer to the target voltage, while the period in which continuous voltage step-up of the output voltage occurs can be made longer, compared to the conventional DC-DC converter.

In addition to the effect achieved by the DC-DC converter above, the following effect can also be achieved. The detection device detects the amount of drop with a DC voltage supplied from the main battery being used as the target voltage. In other words, when the voltage value of the DC voltage supplied from the main battery drops, the detection device detects the amount of drop with the dropped voltage value being used as the target voltage. Accordingly, when the DC voltage supplied by the main battery lowers, the output voltage can be lowered accordingly. Therefore, as the DC voltage supplied from the main battery lowers, the boosted output voltage becomes relatively higher than the DC voltage supplied from the main battery, such that the auxiliary battery can be prevented from being considerably discharged against the main battery. Accordingly, the operational period of the auxiliary battery can be extended. Also, the detection device uses the reduced voltage value of the main battery as the target voltage, such that the step-up rate of the output voltage can be suppressed to a lower rate, compared to the conventional DC-DC converter in which a detection device uses a predetermined constant voltage as a target voltage. As a result, the time in which the duty ratio is a maximum value (maximum value is less than 1) can be extended, compared to the conventional DC-DC converter. Accordingly, the operational period of the main battery used together with the DC-DC converter can be extended, compared to the conventional DC-DC converter.

The invention has been described above based on some embodiments, but the invention is not at all limited to the embodiments described above, and it is readily understood that various modifications and improvements can be made without departing from the subject matter of the invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A direct current-to-direct current (DC-DC) converter comprising:
   an inductor;
   a power supply configured to supply direct current (DC) to the inductor;
   a switching device configured to:
      control the supply of DC from the power supply to the inductor by switching between a conductive state and a disconnected state according to a modulation signal input to the switching device, and
      generate an electromotive force in response to the modulation signal;
   a signal output device configured to:
      generate the modulation signal, and
      increase or decrease a duty ratio of the modulation signal to increase or decrease the period of the conductive state of the switching device;
   a rectifier configured to rectify the generated electromotive force;
   a smoothing and charging device configured to smooth and charge the rectified electromotive force, wherein the smoothed and charged rectified electromotive force is supplied as an output voltage to a load connected in parallel with the smoothing and charging device;
   a voltage detector configured to detect an amount of decrease of the output voltage relative to a target voltage;
   an instruction device configured to instruct a monotonic increase of the duty ratio when the amount of decrease of the detected output voltage increases; and
   a delay device configured to:
      control the monotonic increase of the duty ratio according to the instruction from the instruction device, and
      allow the instruction device to provide the instruction to monotonically increase the duty ratio when the duty ratio is less than a value of 1.

2. The DC-DC converter of claim 1, wherein the signal output device is further configured to output the modulation signal with the duty ratio according to the instruction of the instruction device.

3. The DC-DC converter of claim 1, wherein the delay device is further configured to approximate the monotonic increase of the duty ratio when the duty ratio is greater than the value of 1.

4. The DC-DC converter of claim 3, wherein the delay device is further configured to suppress the duty ratio such that the duty ration is less than a value of 0.8.

5. The DC-DC converter of claim 4, wherein the signal output device is further configured to output the modulation signal with the suppressed duty ratio such that the the duty ratio is the value of 1 when the modulation signal is input to the switching device.

6. The DC-DC converter of claim 1, further comprising a main battery configured to supply DC to the load independent of an increase to the output voltage supplied from the smoothing and charging device.

7. The DC-DC converter of claim 6, wherein:
   the main battery comprises a primary battery or a secondary battery;
   the power supply comprises the primary battery when the main battery comprises the secondary battery; and
   the power supply comprises the secondary battery when the main battery comprises the primary battery.

8. The DC-DC converter of claim 6, wherein the target voltage is determined by the DC supplied from the main battery.

9. The DC-DC converter of claim 1, wherein the duty ratio is a proportion of time when a signal output period occupies a signal cycle with respect to the entire signal cycle.

* * * * *